US012269301B2

(12) United States Patent
Bill

(10) Patent No.: US 12,269,301 B2
(45) Date of Patent: Apr. 8, 2025

(54) AIRCRAFT SYSTEM AND METHOD

(71) Applicant: AIRBUS OPERATIONS LIMITED, Bristol (GB)

(72) Inventor: Andrew Bill, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 572 days.

(21) Appl. No.: 17/410,644

(22) Filed: Aug. 24, 2021

(65) Prior Publication Data

US 2022/0134813 A1 May 5, 2022

(30) Foreign Application Priority Data

Oct. 30, 2020 (GB) ...................................... 2017246

(51) Int. Cl.
*B60C 23/00* (2006.01)
*B64F 5/60* (2017.01)
*G07C 5/08* (2006.01)

(52) U.S. Cl.
CPC .............. *B60C 23/002* (2013.01); *B64F 5/60* (2017.01); *G07C 5/085* (2013.01); *B60C 2200/02* (2013.01)

(58) Field of Classification Search
CPC .............. B60C 23/002; B60C 2200/02; B60C 23/0408; B60C 23/0477; B60C 23/0476; B60C 23/0406; B60C 23/0486; B60C 23/20; B60C 23/04; B60C 23/0474; B64F 5/60; G07C 5/085
See application file for complete search history.

(56) References Cited

U.S. PATENT DOCUMENTS

| 8,599,044 B2 | 12/2013 | Maggiore et al. |
| 2005/0264472 A1* | 12/2005 | Rast ........................ G09G 3/14 345/30 |
| 2012/0095622 A1* | 4/2012 | Lynch ...................... G07C 5/08 701/3 |
| 2012/0119897 A1* | 5/2012 | Oh ...................... B60R 16/0234 340/457.4 |
| 2016/0009290 A1 | 1/2016 | Benedict et al. |
| 2016/0272020 A1 | 9/2016 | Bill |

(Continued)

FOREIGN PATENT DOCUMENTS

| EP | 1 227 018 | 7/2002 |
| EP | 2 871 079 | 5/2015 |

(Continued)

OTHER PUBLICATIONS

European Search Report cited in EP 21192516.9 mailed Feb. 1, 2022, 14 pages.

(Continued)

*Primary Examiner* — Hitesh Patel
*Assistant Examiner* — Wenyuan Yang
(74) *Attorney, Agent, or Firm* — Nixon & Vanderhye P.C.

(57) ABSTRACT

A computer-implemented method of tire maintenance including: receiving data of a plurality of tire gas pressure measurements each measurement having an associated time; analyzing the received data to determine maintenance information, wherein the maintenance information comprises at least one of: an inflation event, a maximum pressure, a minimum pressure and a tire replacement event; and providing an indication based the determined maintenance information.

17 Claims, 9 Drawing Sheets

(56) References Cited

U.S. PATENT DOCUMENTS

| | | | | |
|---|---|---|---|---|
| 2016/0272021 A1* | 9/2016 | Bill | ........................ | G01K 11/00 |
| 2017/0015151 A1* | 1/2017 | Bill | ..................... | B60C 23/0479 |
| 2017/0096037 A1* | 4/2017 | Smith | .................. | B60C 23/0488 |
| 2017/0217572 A1* | 8/2017 | Vana | ................... | B60C 23/0408 |
| 2020/0031366 A1* | 1/2020 | Robson | ............... | B60C 23/0406 |
| 2021/0402832 A1* | 12/2021 | Stalnaker | ............ | B60C 23/0476 |

FOREIGN PATENT DOCUMENTS

| | | |
|---|---|---|
| EP | 2 910 393 | 8/2015 |
| EP | 3 069 904 | 9/2016 |
| EP | 3 118 030 | 1/2017 |
| EP | 3 498 501 | 6/2019 |
| GB | 2540414 | 1/2017 |
| GB | 2584848 | 12/2020 |
| GB | 2586213 | 2/2021 |

OTHER PUBLICATIONS

Combined GB Search and Exam Report cited in GB 2017246.6, mailed Mar. 11, 2021, 7 pages.

* cited by examiner

AIRCRAFT SYSTEM AND METHOD

RELATED APPLICATION

This application claims priority to and incorporates by reference in its entirety United Kingdom Patent Application GB 2017246.6, filed Oct. 30, 2020.

TECHNICAL FIELD

The present invention relates to methods of tire maintenance using historical data and tire monitoring devices and systems implementing those methods.

BACKGROUND

Monitoring of tire inflation pressures is an important part of aircraft maintenance. An underinflated tire is more likely to burst during take-off and/or landing and a tire burst can cause significant damage to surrounding aircraft structures. Tire pressure checks are therefore mandated to be carried out at regular intervals for commercial aircraft.

Current methods of tire pressure checking include manual methods (using a pressure gauge to measure each individual tire manually) and automated methods (interrogating pressure sensors attached to each wheel to measure the associated tire pressure). Regardless of whether the pressure check is manual or automated, a decision on tire pressure maintenance is based on readings of all the tires taken in a single measurement session. For example, with manual measurements each tire pressure is measured in sequence and recorded. With automated measurements each tire pressure may be measured substantially simultaneously or may be measured in sequence.

In order to give a reliable result, tire pressure should be measured when the gas in the tire is at ambient temperature. If the tire is above ambient temperature this will increase the measured pressure, so that a tire requiring maintenance may not be correctly identified. If the tire pressure is measured when "hot" or above ambient temperature, the additional gas temperature above ambient will mean that the pressure is higher so that under-inflation is not detected. It can take a long time for the gas in the tire to reach ambient temperature because it is subject to heating from nearby brake system components, such as brake discs, radiating heat while they cool even though the aircraft is standing. Airbus therefore require waiting at least three hours with the aircraft standing before carrying out a tire pressure measurement.

This three-hour requirement can impose significant operational constraints, especially when turnaround is short, so the opportunity to take a tire pressure measurement may be restricted. For example it may only be possible when the aircraft is not in use overnight and has stood for the required amount of time.

Automated pressure sensing devices affixed to an aircraft wheel may include a temperature sensor, but this does not measure the gas temperature directly. The nature of fixation to the wheel means that although pressure is sensed directly, temperature is measured indirectly, by a temperature sensor within the sensing device. The temperature sensor is indirectly coupled to the gas in the tire, it therefore cannot be assumed that the temperature measured is the same as the gas temperature in the tire. Furthermore, the relationship between gas temperature and the temperature sensor is complex, impacted by factors such as time for heat to transfer through the wheel and external heat sources, such as cooling brake discs and current weather conditions.

It would be desirable to improve aircraft tire maintenance.

SUMMARY

According to a first aspect of the present invention, there is provided a computer-implemented method of tire maintenance. The method comprises: receiving data of a plurality of tire gas pressure measurements each measurement having an associated time; analyzing the received data to determine maintenance information, wherein the maintenance information comprises at least one of: an inflation event, a maximum pressure, a minimum pressure and a tire replacement event; and providing an indication based the determined maintenance information.

The maintenance information may comprise a minimum pressure and the analyzing can then comprise: determining a minimum pressure between two consecutive inflation events; and determining that the minimum pressure is lower than a predetermined threshold. A period of time for which the pressure was lower than the predetermined threshold may be determined.

The maintenance information may comprise a maximum pressure and the analyzing can then comprise: determining a maximum pressure between two consecutive inflation events; and determining that the maximum pressure is greater than a predetermined threshold.

The maintenance information may comprise an inflation event and the analyzing can then comprise: determining an inflation event by identifying a positive pressure greater gradient which is greater than 1 psi per minute. An inflation frequency or an interval between consecutive inflation events may then be determined.

The analyzing may comprises determining a tire replacement frequency or an interval between consecutive tire replacements.

Data of a retread count of the tire may be received and used in determining whether there is a correlation between the retread count and the inflation frequency, interval between consecutive inflation events, tire replacement frequency, or interval between consecutive tire replacements.

The received data may relate to at least two tires on a same aircraft and the analyzing can then comprise comparing determined maintenance information of the at least two tires. For example, the analyzing data may comprise: determining a deflation rate of the at least two tires; and determining that the deflation rate of a first of the least two tires is greater than the deflation rate of another of the at least two tires.

According to a second aspect of the present invention, there is provided a computer-implemented method of tire maintenance. The method comprises: receiving data of a plurality of tire gas pressure measurements each measurement having an associated time; analyzing the received data to determine a plurality of inflation events; determining a minimum pressure between two consecutive inflation events; determining maintenance information based on comparing the minimum pressure to a predetermined threshold; and providing an indication based on the maintenance information.

The methods of the first or second aspect may comprise normalizing the pressure data to express pressure at a predetermined reference temperature.

The method of the first or second aspect may comprise scheduling a maintenance action based on the determined maintenance information.

In the method of the first or second aspect, the received data may comprise data comprising a unique tire identifier associated with the plurality of tire gas pressure measurements. The method may then comprise one or both of: determining, using a database, that the unique tire identifier corresponds to a tire which is safe to use; and updating a database based on the maintenance information and the tire unique identifier.

According to a third aspect of the invention, there is provided a processing system configured to implement the method of the first or second aspect.

According to a fourth aspect of the invention, there is provided a computer readable medium comprising computer executable instructions that, when executed by a processing system, instruct the processing system to perform the method of the first or second aspect.

Further features and advantages of the invention will become apparent from the following description of embodiments of the invention, given by way of example only, which is made with reference to the accompanying drawings.

DETAILED DESCRIPTION

Figure 1:
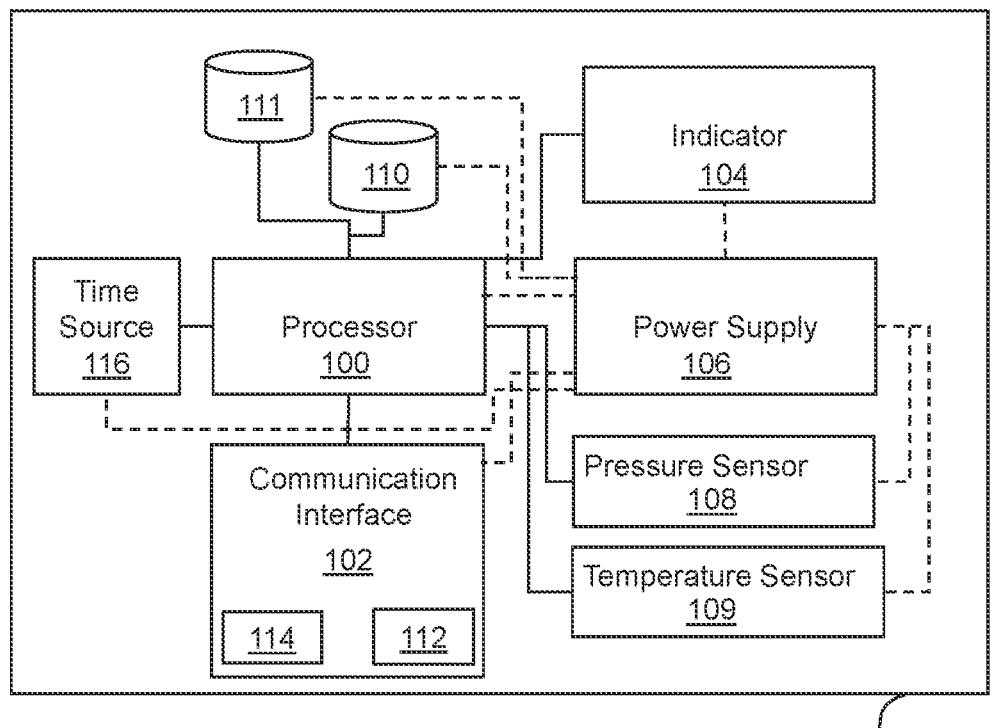
FIG. 1 shows a schematic representation of a tire monitoring device.

It has been found that if a history of tire pressure and temperature measurements is maintained, the historical data can be used to improve the reliability of tire pressure measurement and enable improved tire maintenance.

With the advent of automated, electronic tire monitoring devices which are fixed to an aircraft wheel, measurements of tire pressure can be taken at regular intervals to obtain historical data of pressure without requiring operator input and stored with an associated time of measurement or time stamp. When the tire monitoring device also includes a temperature sensor, temperature data can also be stored along with the pressure data. A history of pressure/temperature pairs with an associated time stamp can therefore be built up over time.

Both pressure and temperature vary dependent on the aircraft's operation including the length of flights, turn-around times, ambient temperature at destinations and weather at destinations. As discussed above, the temperature sensor may not directly measure the gas temperature, so it cannot be assumed that the temperature measured by the temperature sensor is an accurate measurement of the actual gas temperature in the tire. The inventor has recognized that even indirect measurements of temperature can be assumed to be an accurate measurement once both pressure and temperature have stabilized, as will now be explained in more detail.

Stable points of pressure occur when the temperature of the gas in the tire is changing by a relatively small amount, which is often close to the ambient temperature. This means that sources of heat, such as hot brake discs, have cooled and the temperature of the gas is stable. (Over the short term, such as over 10, 20, 30 minutes or similar, changes in measured pressure are most strongly dependent on temperature.) While stable pressure often occurs at a gas temperature close to ambient temperature, this is not necessarily the case; wind chill and heating from direct sun may have an effect on the gas temperature. So, there can still be uncertainty over the actual gas temperature. It has been recognized that if the temperature measured by the temperature sensor is also stable, then that measurement is a more accurate indicator of gas temperature, even for an indirect measurement of temperature. The tire monitoring device containing the temperature sensor is affixed to the same wheel as the tire so will be exposed to generally the same ambient temperature and external heating or cooling effects as the tire. In the same way that the gas in the tire has stabilized in temperature, so has the temperature of the sensing device. Even though the measurement of temperature using a temperature sensor is an indirect measurement, it is a close approximation of gas temperature at these stable points.

Stable points can be identified from a time series of pressure and temperature measurement pairs by determining data in the time series where both pressure and temperature change by a small amount over a predetermined time. For example, a stable point can be identified or determined when pressure and temperature both vary by less than 5%, less than 4%, less than 3%, less than 2% or less than 1% over a time period such as 10 minutes, 20 minutes or 30 minutes. Such points can then be taken as accurate measurements of both pressure and gas temperature in the tire and used in a variety of ways for tire maintenance and/or monitoring. The variation in temperature is preferably measured with temperature expressed in Kelvin, because although the change is relative (and therefore dimensionless), the different zero point on the Celsius and Fahrenheit scales can act to exaggerate sensitivity to changes close to the zero point. In the Celsius scale in particular, the zero point is close to ambient temperatures in some destinations.

In other examples a stable point can be identified from absolute changes. A stable pressure may be one which varies by less than 5 psi, less than 3 psi or less than 1 psi over a time period of 10 minutes, 20 minutes or 30 minutes. A stable temperature may be one which varies by less than 5° C., less than 3° C. or less than 1° C. over a time period of 10 minutes, 20 minutes or 30 minutes.

In further examples, a stable point may be identified by a substantially similar rate of change in pressure and a substantially similar rate of change in temperature at the start and end of a predetermined period of time. The period of time may be 5 minutes, 10 minutes, 20 minutes or 30 minutes. A substantially similar rate of change in both temperature and pressure suggests that the temperature measurement is accurately tracking the pressure measurement so even though the change in absolute values over the time period may be large, the temperature can nevertheless be taken as an accurate representation of the gas temperature in the tire. More specifically, if the gradient of pressure against time is less than 1%, less than 3% or less than 5% different at the start and end of the predetermined period of time; and if the gradient of temperature against time is less than 1%, less than 3% or less than 5% different at the start and end of the predetermined period of time then that period of time may be identified as containing a stable point.

It is a characteristic of such stable points that the measured quantity is not changing significantly over time, so that a high frequency of measurement is not required; a stable point will be one where the change is small over a matter of minutes. However, there is also a maximum limit for the time interval used to assess stable points. If the gap between measurements is too long, it may be hard to identify stable points due to changes in the ambient temperature or a stable point may be mistakenly identified despite intervening fluctuations in temperature. For example, if the length of time between measurements is 2 hours this may be long enough for changes in ambient temperature during the day to create enough change in temperature that a stable point is not identified. Equally, a time between measurements of 2 hours may be enough that a short haul flight cycle causes the measurements to appear stable when in fact there is significant variation. In both cases a shorter time between measurements, such as every 10 minutes, every 20 minutes or every 30 minutes can enable a stable point to be determined more reliably.

Once a set of stable pressure and temperature points has been identified, pressure trends in the tire can be identified and used to monitor and/or maintain the tire.

The pressure and temperature data can be stored in memory of the individual sensors themselves or elsewhere, for example in a central system within the aircraft itself or remote from the aircraft, such as a cockpit system or at a maintenance facility. While there may be constraints on the amount of memory which can integrated into the sensors themselves, so that it limits the amount of data that can be retained, transferring the data and storing it elsewhere may enable long histories of measurement data to be stored. For example, a central system may have effectively unlimited data storage for pressure and temperature pairs so that measurement data may be maintained for the entire tire service life. Such a system can also maintain data that persists across physical changes to the tire, such as retreading (also referred to as remolding).

As a further benefit, through the use of an automated sensor to take the measurements, data can be obtained automatically, without additional labor required from maintenance staff.

Measurement data may initially be stored in the tire monitoring device itself, in a central system which is part of aircraft, or both. This measurement data may be transferred to another device or system at times when a tire pressure measurement takes place, for example when a mandated tire pressure check takes place.

Once determined, the stable pressure measurements may be converted or normalized to a pressure at a same predetermined temperature so that they can be directly compared. For example, the pressure may be converted to a normalized pressure at 15° C. This can be done in several ways. One way is to use a known relation of how much pressure changes following a change in temperature, such as a 10° C. change in temperature changes pressure by 3.7%. Another way is to apply the Ideal Gas Law. Using a known relation may be computationally simpler, while applying the Ideal Gas Law may be more accurate. In both cases, some assumptions about the behavior of the tire and gas inside it are made. These may include that the gas is an ideal gas and that the volume of the tire does not change. Aircraft tires are filled with Nitrogen, which can be considered to behave as an ideal gas over the operating pressure and temperature ranges experienced by aircraft tires. An aircraft tire is inflated to relatively high pressure, typically 200 psi (1379 kPa/13.79 Bar) and the construction of tire means that volume change is minimal over the tire's operating pressure range.

Further assumptions or variables may also be considered, such as whether the tire is loaded or unloaded (measurement during flight will be unloaded, for example). This may dependent on the specific aircraft and tire configuration. For example, it has been suggested that the difference in measured pressure between an unloaded tire and loaded tire is 4%, while other tests carried out on an Airbus A380 suggested that there is little measurable change in tire pressure between loaded and unloaded states. The impact of tire loading on pressure may therefore depend on particular aircraft model or particular combinations, such as of two or more of aircraft model, wheel configuration and tire model. If tire loading is considered to adjust the pressure measurements, then those periods where a tire is unloaded can be identified from trends in the historical data and the measurements adjusted depending on the loading state of the tire. For example, the historical data may be examined for a relatively steep upward gradient in the pressure or temperature measurement followed by cooling. Such steep upward gradients generally correspond to a landing events so the loading state can be changed to loaded. Similarly, the low temperature when flying at cruising altitudes can allow flight periods to be identified, through absolute temperature or by a relatively steep downward gradient in the temperature or pressure measurements. Take off events may be identified by a relatively small absolute increase in pressure or temperature, or a relatively shallow upward gradient in pressure and temperature, followed by cooling.

The methods and applications discussed herein can be applied to any aircraft using tire monitoring devices that can be instructed to measure pressure and temperature at regular intervals and cause those measurements to be stored with an associated timestamp. An example tire monitoring device is shown in schematic format in FIG. 1.

FIG. 1 shows a schematic representation of a tire sensing device or tire monitoring device 10 for use with the methods and applications described herein. The tire monitoring device 10 is configured for mounting on a wheel, for example by a mechanical connection to an opening on the wheel providing access to the tire. The tire monitoring device 10 includes a processor 100, a communication interface 102, an indicator 104, a power supply 106, a pressure sensor 108, a temperature sensor 109, a first storage 110, a second storage 111 and a time source 116.

Processor 100 may be any suitable processing device including a microprocessor with one or more processing cores. In use, processor 100 coordinates and controls the other components and may be operative to read and/or write computer program instructions and data from/to the storage 110, 111.

Communication interface 102 is connected to the processor 100 and is used to both transmit and receive data from the other devices within a tire pressure sensor system. In this example, the communication interface is a wireless communication interface including two transceivers, 112, 114 which both use different wireless technology. A first transceiver 112 is provided for relatively long-range communication, up to about 50 m or about 100 m. For example, the first transceiver may use a communication standard suitable for mobile devices, such as IEEE 802.15.1, IEEE 802.15.4, IEEE 802.11 (Wi-Fi) on either the 2.4 GHz or 5 GHz Industrial Scientific and Medical (ISM) bands or a Wireless Avionics Intra-Communications (WAIC) standard. The first transceiver also includes an encryption module for encrypting sent data and decrypting received data, for example according to the Advanced Encryption Standard (AES) utilizing pre-shared keys. A second transceiver 114 is provided for relatively short-range communications. For example, the second transceiver 114 may use a standard according to IEEE 802.15, such as IEEE 802.15.4, RFID or Near Field Communication (NFC). The second transceiver may operate over a range of less than 5 m, less than 3 m, less than 1 m, less than 50 cm, less than 25 cm, less than 10 cm, less than 5 cm, less than 1 cm or requiring contact between devices. Like the first transceiver 112, the second transceiver 114 also includes an encryption module for encrypting sent data and decrypting received data.

In some examples, a single wireless transceiver may be provided in the wireless communication interface. In that case the single transceiver may use relatively short range or relatively long range communication, or adjust the range (such as by controlling transmit power) as required.

Indicator 104 is connected to the processor 100 and controlled by the processor 100 to provide indications to a user of the tire pressure sensor system. In this example the indicator is an LED, but in other examples the indicator is another form of light, a display, such as an LCD or e-ink display, or any other form of visual indication. In other examples, the indicator is an audible indicator, such as a buzzer, beeper, speaker or any other sound generating component. In further examples, the indicator can comprise both audible and visual indication components. The indicator provides at least first and second indications, for example a first color and a second color of emitted light. Further indications can also be provided, such as solid or flashing light. The tire monitoring device has a housing (not shown) and the indicator 104 can provide an indication outside the housing, for example the LED may be mounted external to the housing or visible through the housing, or sound may be able to be emitted from within the housing.

The power supply 106 provides power to the elements of the sensing device. It may be a battery, such as Lithium battery. In this example, the power supply is a Lithium battery with power sufficient to run the sensor in normal operation for several years, such as 2 to 3 years. In other examples the power supply may comprise a power harvesting system, for example harvesting vibration and/or electromagnetic radiation to charge a capacitor or battery which is then used to power the device.

In use, the tire monitoring device may spend much of its operational life in "sleep" or low power mode, with most of the components other than the processor and wireless communication interface powered off. This can conserve battery life. For example, the tire monitoring device may be by default in a low power mode, listening for a command to measure or report tire pressure. While in this low power mode the tire monitoring device can be scheduled or otherwise caused to wake up at predetermined intervals or times, sense pressure and temperature and store the results. For example, pressure and temperature may be sensed every minute, every 5 minutes, every 10 minutes, every 15 minutes, every 20 minutes, every 30 minutes, every hour or every 2 hours and stored for use in trend monitoring. It has been found that a measurement every 10 minutes provides a good balance between conserving power and providing useful data for historical trend monitoring.

The pressure sensor 108 is connected to processor 100 and may be any suitable sensor for measuring pressure, for example a capacitive sensor. Similarly, the temperature sensor 109 is connected to processor 100 and may be any suitable sensor for measuring temperature, such as thermocouple. The temperature sensor 109 is arranged to measure the temperature of the gas inside the tire indirectly, by measuring a temperature associated with part of the sensing device which is thermally coupled with the gas through the connection to the wheel.

The connection of the pressure sensor 108 and temperature sensor 109 to the processor 100 may be digital, providing a digital representation of the measured pressure and/or temperature from an Analogue to Digital Convertor (ADC) in the sensor itself, or analogue, in which case the processor may include an ADC to sample the received signal. Including both a pressure sensor and a temperature may be useful to determine a temperature compensated pressure value.

This example includes two storage elements 110 and 111. Storage 110 is non-volatile rewritable storage in this example, such as flash memory which can retain data without requiring applied power. Other examples may include volatile storage, which is kept powered by the power supply, or combinations of read-only and rewritable storage. Storage 110 is connected to the processor 100 and used to store both computer program instructions for execution by the processor and data, such as data from the pressure sensor 108 or data received over the wireless communication interface 102. Storage 110 is therefore configured to store a history of pressure and/or temperature readings sensed by the pressure sensor 108 and the temperature sensor 109. The history may be stored for at least the maximum time between a pressure measurement for tire maintenance, such as for at least three days. This can ensure that enough history is held to provide details since the last maintenance tire pressure reading, so that the history can be transferred for use in trend analysis, along with the current pressure measurement data. In other examples, longer periods of history may also be kept. For example, the previous ten days readings may be stored, with the newest data replacing the oldest once the storage is full, such as using a FIFO structure or similar.

Storage 111 is secure storage to which write and/or read access is restricted, for example only accessible to certain processes running on processor 100. Configuration data, such as wireless encryption keys can be stored in storage 111. In other examples, a single storage may be provided, or storage 110 and 111 may be provided in a single physical device with a logical partitioning between storage 110 and storage 111.

The tire monitoring device 10 also comprises a time source 116, such as a counter or a real time clock. The time source provides a value indicative of current time for indicating the time at which a measurement was taken, for example the processor 100 may cause a current value of the time source to be associated with each pressure and temperature measurement when it is stored in the storage for use as a timestamp.

A timestamp may be an indication of real time (such as Coordinated Universal Time, UTC). A timestamp may also be a relative measurement, such as a counter value where the counter is initialized at a point in the use of the tire monitoring device, such as when the tire monitoring device is first put into service. Where relative timestamps are used, they may be converted to a real time by noting the value of the timestamp for a known time and considering the interval at which the counter is incremented.

It is not required for the time source 116 to be synchronized with other tire monitoring devices on the same aircraft because the methods using historical data described herein can be applied to the data of each monitoring device independently. When data of more than one tire monitoring device is required to be viewed on a common timeline timestamps can be converted to a common reference timeline. For example the current time when a mandated tire pressure measurement takes place may be recorded along with a corresponding value of the timestamp and used to convert.

Figure 2:
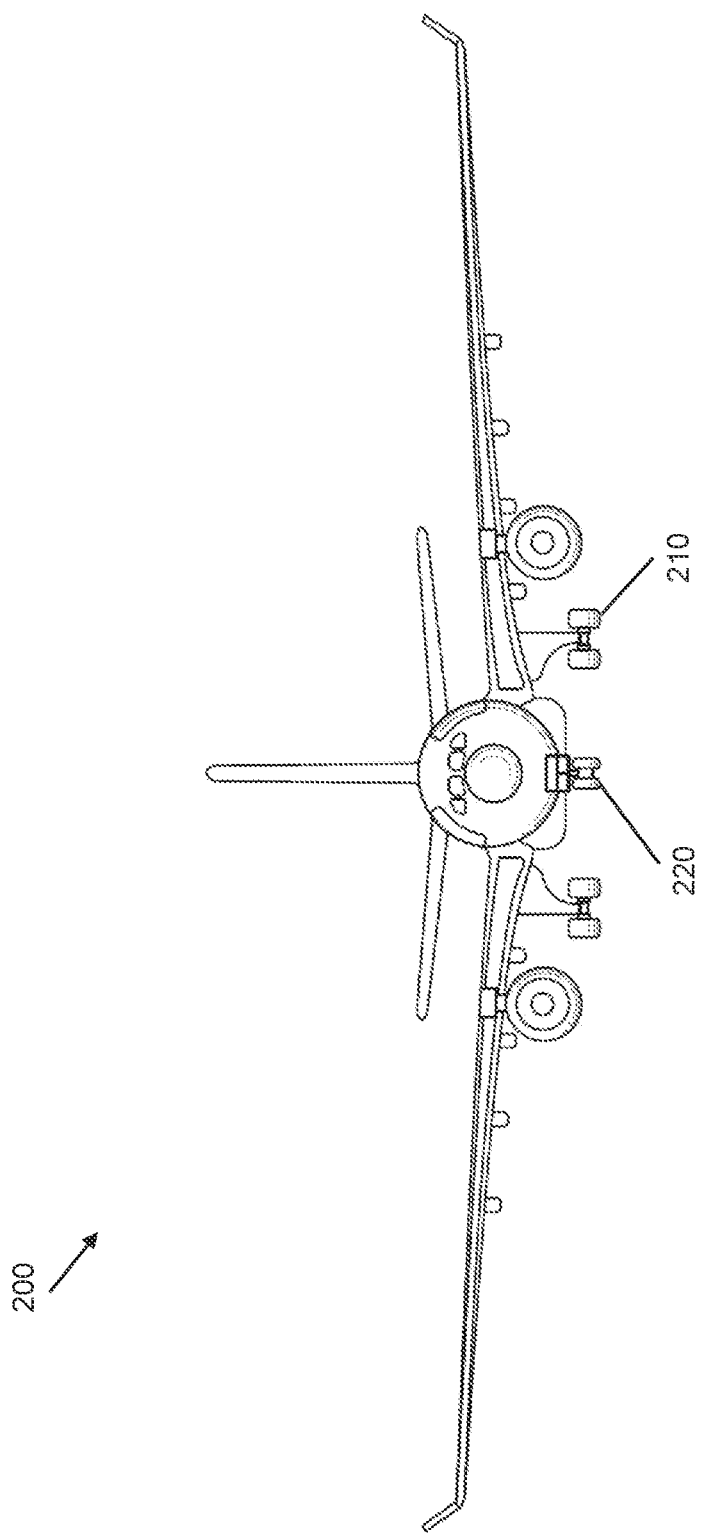
FIG. 2 shows a diagrammatic representation of an aircraft.

A tire monitoring device 10 is provided on each wheel of an aircraft. An example aircraft 200 is depicted in FIG. 2, which is a diagrammatic representation of a front view of an Airbus A320 aircraft. The aircraft has six wheels in total; four wheels as part of the main landing gear 210 and two wheels as part of the nose landing gear 220. The aircraft 200 therefore has six tire monitoring devices. Other models of aircraft may have different numbers of wheels and hence different numbers of tire monitoring devices. An Airbus A380 has twenty-two wheels and so will have twenty-two tire monitoring devices, for example.

In one example, the aircraft may include a tire monitoring system which is integrated with a central system of the aircraft, so that the tire monitoring devices themselves are in communication with the central system. For example, the aircraft may be provided with a monitoring system which is accessible through an interface in the cockpit of the aircraft and/or through a separate maintenance system when on the ground. An example of an aircraft with a central system for tire monitoring is the Airbus A380.

In another example, the tire monitoring system may be a standalone system of tire monitoring devices which operate independently from other aircraft systems. Such a system may be provided on an aircraft from new or retrofitted to add functionality to an existing aircraft. An example of such a system is described in EP-3 498 501A1, incorporated herein by reference for all purposes.

Figure 3:
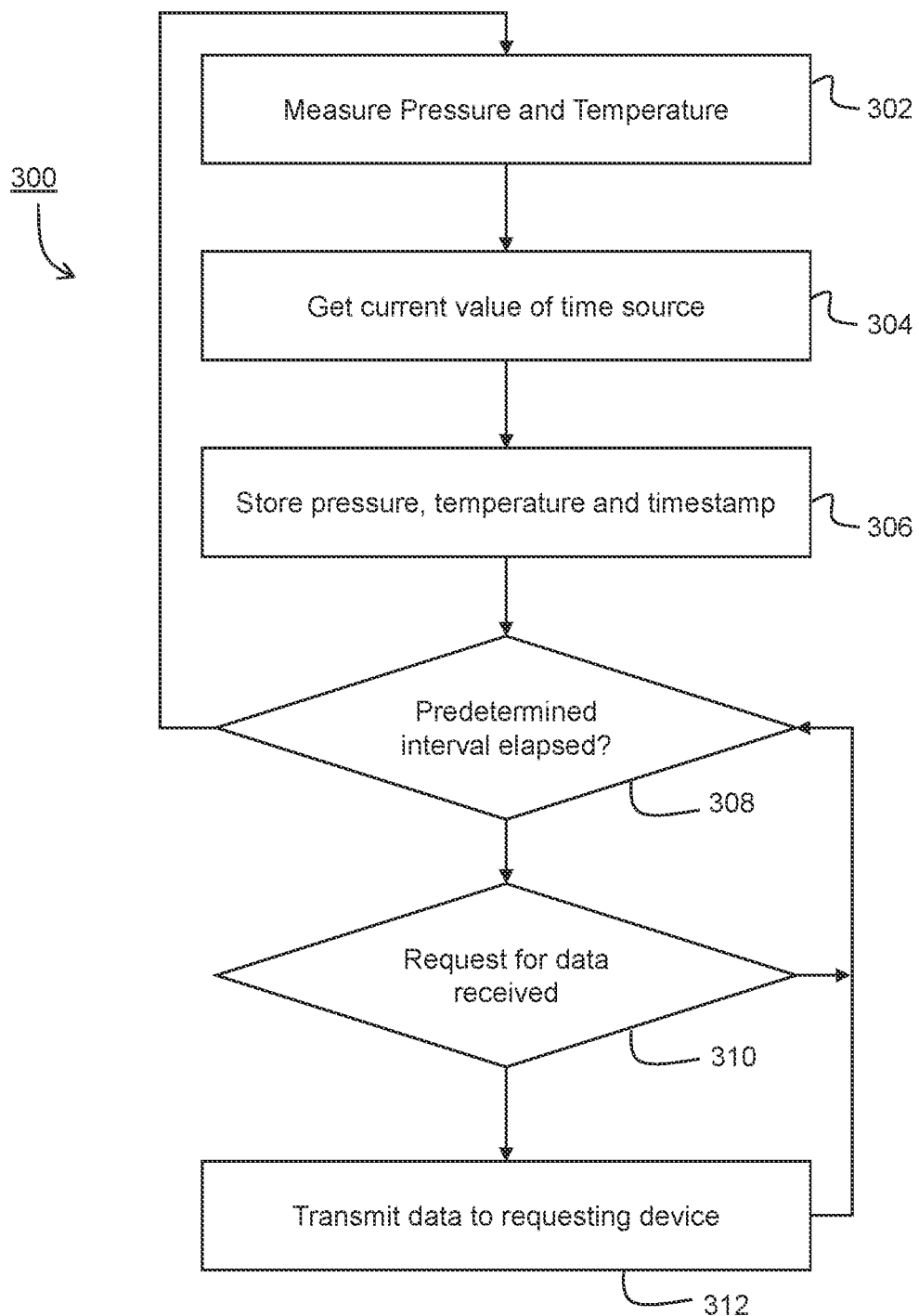
FIG. 3 is a flow chart of an example method for a tire monitoring device to store a history of temperature and pressure measurements.

FIG. 3 depicts a method 300 which can be implemented by a tire monitoring device 10 in order to store a history of temperature and pressure measurements. First, at block 302, the device 10 measures both the pressure and temperature using the pressure sensor and the temperature sensor. The current time is read from the time source at block 304. Next, at block 306, the pressure and temperature measurements are stored in the storage along with an associated timestamp based on the time read from the time source. A single data structure may be used to hold the pressure, temperature and timestamp; the pressure and timestamp may be stored in a separate data structure from the temperature and timestamp; or the pressure, temperature and timestamp may be all be stored separately and associated by common key such as an index number. A single data structure may reduce storage requirements, but separate data structures may allow more flexibility.

Pressure can be stored in any suitable unit, such as psi, atm, or kPa. Likewise, temperature can be stored in any suitable unit, such as ° C. or K. The timestamp can be a value of the time source or expressed relative to a real time base, such as UTC.

The blocks 302, 304 and 306 are repeated at predetermined intervals. The predetermined interval may be governed by a querying a timer, scheduling at an interrupt at an appropriate time interval and any other suitable method. The predetermined interval can be regular, for example taking a measurement once every 1, 5, 10, 15, 20 or 30 minutes. A measurement every 10 minutes has been found to present a good balance between power saving and gathering enough historical data to allow useful analysis. As depicted in FIG. 3, at block 308 it is determined whether a predetermined time interval has elapsed. If it has the method proceeds to block 302 to take another measurement, if it has not the method proceeds to block 310.

The tire monitoring device can provide a plurality of the stored data to a requesting device in response to a request from another device, such as a maintenance device or a central maintenance system. In the method of FIG. 3, at block 310, while waiting for the next measurement task, the tire monitoring device can monitor for a received request over the communication interface and provide a response, such as by determining if a request for historical data has been received at block 310. If a request has been received, execution proceeds to block 312, otherwise execution returns to block 308.

At block 312, at least a portion of the stored data is provided to the requesting device using the communication interface. For example, the request may specify a required time period for the data or the device may transmit the most recent data for a predetermined period, such for the last day, the last 3 days or the last 10 days. In other examples all the data in the storage is provided to the requesting device.

According to the method of FIG. 3, tire monitoring devices can measure and store data on pressure and temperature over time and provide it to a requesting device. While FIG. 3 has described the use of logical tests at blocks 308 and 310, other examples may use an event-driven structure.

In examples where the tire monitoring device is in communication with a central system of the aircraft, each measurement may be transmitted to the central for storage as they are taken, alternatively or additionally to sending data in response to a request in blocks 310 and 312.

Figure 4:
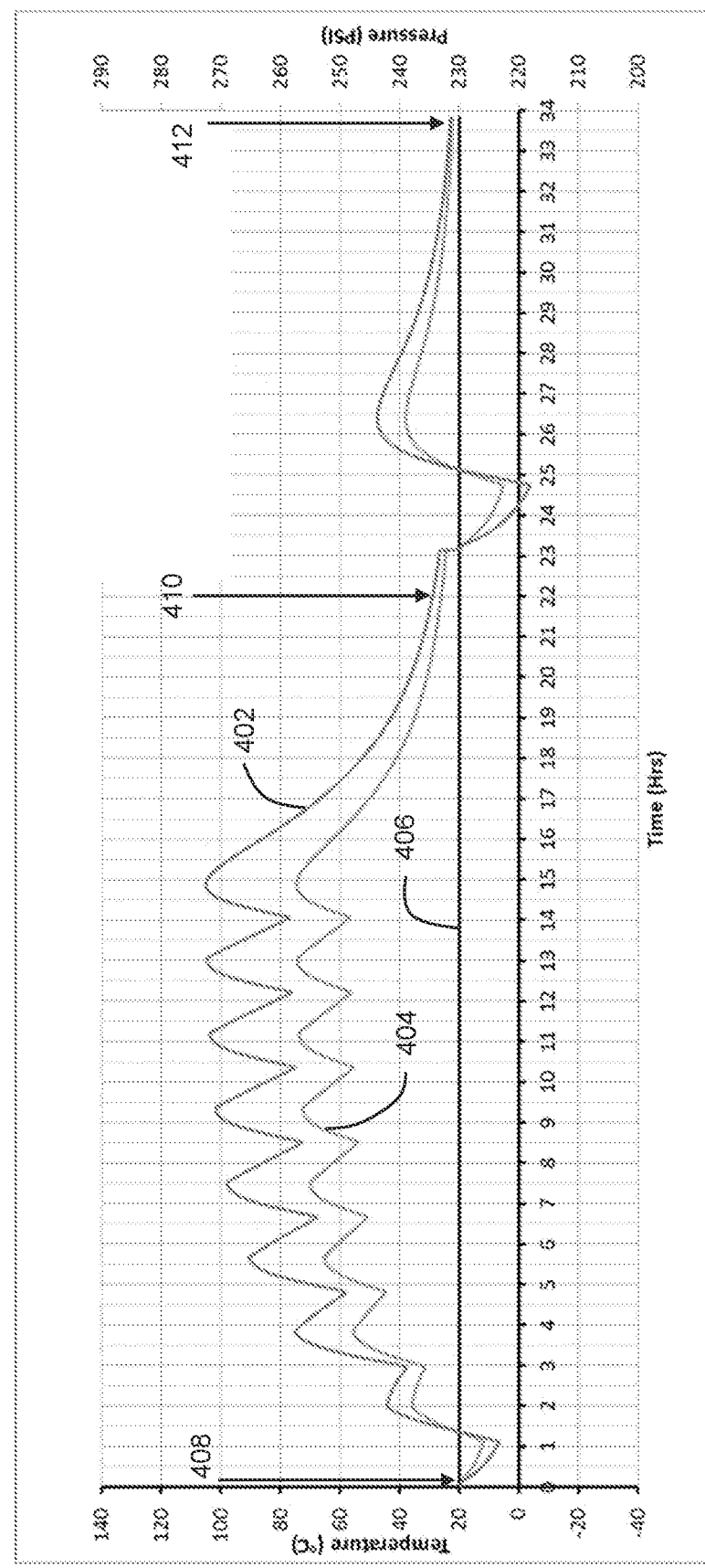
FIG. 4 shows simulated tire pressure and tire gas temperature data against time during operation of an aircraft.

Example data that may be collected by a tire monitoring device as discussed above with reference to FIG. 1 is depicted in the graph of FIG. 4. FIG. 4 depicts simulated pressure and temperature data for an aircraft which carries out eight 1-hour flights on a first day followed by a single 90-minute flight the next day. FIG. 4 depicts the variation in Tire gas pressure 402 (the right-hand axis), Tire gas temperature 404 (left-hand axis) and ambient temperature at ground level 406 (left-hand axis) against time. The simulated data is from a 2-Dimensional Computational Fluid Dynamics (CFD) model of the Wheel, Tire and Brake (WTB). The model is an axisymmetric conjugate heat transfer model which calculates the temperature of all solid and fluid components.

Referring to FIG. 4, the aircraft begins at time=0 hours with pressure and temperature both equal to ambient (20° C./293 K). During the first flight cycle, the low temperature at altitude causes pressure and temperature to drop until the aircraft lands. Landing introduces heat to the tires from several sources, including from the increased temperature at ground level, flexure of the tire on landing and heat radiated from components of the brake system, such as brake discs. The tires continue to heat while the aircraft is standing, for example the brakes radiate heat, warming the gas in the tire, and continue to increase the heat of the gas in the tire for the relatively short time—1 hour—that the aircraft is standing. After take-off the lower temperature at altitude causes cooling, as can be seen for the period from 2 to 3 hours. Landing again causes a heat input and a heating period occurs from time 3 to 4 hours until the aircraft takes off again. The cycle continues until the aircraft ceases operations and stands overnight, from time=14 hours to time=23 hours. During this standing period the pressure and temperature rise to a peak at time 15 hours and then slowly reduces towards ambient. The 90 minute flight between time=23 hours and time=25 hours further cools the tire before temperature rises on landing. Finally, the temperature and pressure again rise to a peak and then reduces towards ambient as the aircraft stands.

The graphs in FIG. 4 show how difficult it is to measure tire pressures reliably for a commercial aircraft because they are constantly changing. In order to ensure that the gas temperature in the tire is close to ambient for an accurate pressure reading, at least a three-hour standing time before taking a pressure measurement is currently mandated, but such a period is not available for much of the day. Even after a three hour standing period, such as can be seen in FIG. 4 from time=14 to 17 hours, tire gas temperature is still around 30° C. above ambient even after three hours standing.

Furthermore, FIG. 4 depicts the actual simulated gas temperature, this is not necessarily the temperature that is measured when the temperature is sensed indirectly as is the case for automated tire monitoring devices. The indirect measurement means that accurate measurement of gas temperature can only be obtained at certain times because the indirect temperature measurement can lead or lag that of the gas in the tire.

It has been found that despite the significant variations during an aircraft operating cycle, historical data of pressure and temperature measurements can be used to improve tire maintenance. By determining stable points in the data, at those stable points the measured temperature is a good representation of the gas temperature, despite the indirect measurement. For example, a stable point may be where the pressure and temperature, in K, both change by less than 2% over a 10 or 20 minute period. This is because the stable nature of the point means that the system is tending towards an equilibrium state where the temperature of all the components of the wheel system is generally the same, so that the indirect measurement is close to the actual gas temperature. Stable points exist in FIG. 4 at the times 0 hours (indicated by arrow 408), 23 hours (indicated by arrow 410) and 34 hours (indicated by arrow 412) for example. These can then be used to determine pressure trends without the influence of the aircraft operating cycle, as will now be described.

Figure 5:
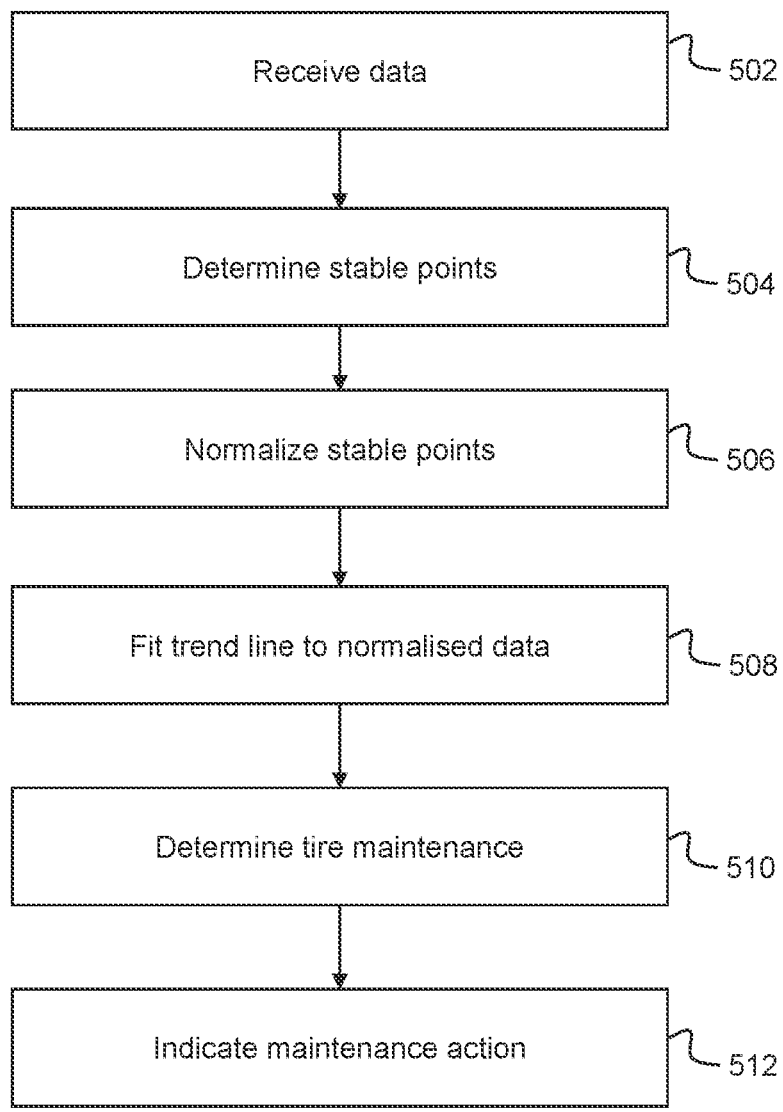
FIG. 5 is a flow chart of an example method for tire maintenance using historical data.

An example computer-implemented method for tire maintenance using historical data that can be executed by a processing system is depicted in FIG. 5. First, at block 502, the data of pressure and temperature measurements and an associated timestamp is received. The data may be retrieved from a storage device or requested from a tire monitoring device, for example.

Next, at block 504, stable points are determined. In this example, the stable points are determined by stepping through the dataset and considering each pair of consecutive data to establish the relative change in both pressure (expressed in psi, kPa or Bar) and temperature (expressed in K). If the change in both is less than 2% then the pair of points are recorded as a stable point. Stable points may be saved in a separate dataset or otherwise marked as stable, for example by setting a flag associated with those data points in the data set. In other examples stable points may be identified by looking for a constant rate of change, such as by determining that the gradient of both pressure and temperature is within 2% for a consecutive pair of data points.

Once the stable points have been identified, the data is normalized at block 506 to express the pressure measurement at a predetermined reference temperature so that the pressure data is directly comparable. For example, a reference temperature of 15° C. (288 K) may be used. This normalization can use any suitable technique. For an aircraft tire, which is filled with nitrogen to pressures around 200 psi (1,380 kPa/13.8 Bar), it can be assumed that the gas in the tire behaves as an ideal gas, and that the tire volume is constant. With these assumptions a relation can be used to normalize the pressures, for example that a change of 10 K in temperature corresponds to a 3.7% change in the pressure. Alternatively, with the assumption of an ideal gas and constant volume, the pressure may be converted using the Ideal Gas law as follows:

$$P_{end} = \frac{P_{start} T_{end}}{T_{start}}$$

Where $P_{end}$ is the pressure expressed at the desired temperature, such as a reference temperature, $P_{start}$ is the measured pressure, $T_{end}$ is the reference temperature in K and $T_{start}$ is the measured temperature in K.

This normalized data can then be used to fit a trend line to the pressure over time at block 508, for example using linear regression with least squares. The least squares method is computationally simple and works well in this application because pressure loss from a tire can be assumed to be a straight line between reinflation events. (A straight line approximation is reasonable because the overall pressure change is small; a tire will be re-inflated when it is at lower than 100% of its normal operating pressure). Other examples may use other methods to determine the trend line, including fitting a curve or polynomial rather than a straight line.

Figure 6:
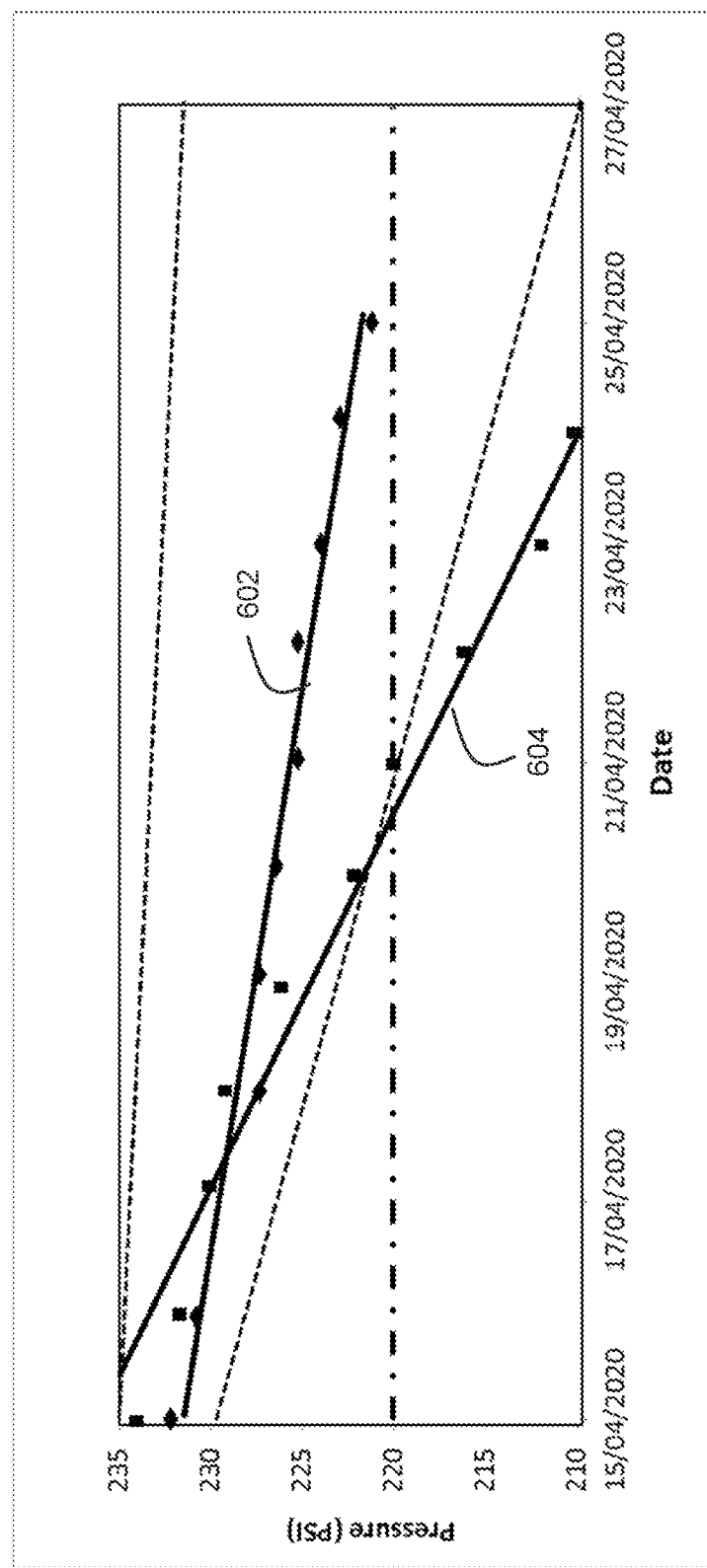
FIG. 6 depicts example pressure trend lines against time.

FIG. 6 shows some example trend lines that might result once the stable points have been identified, normalized and a trend line fitted to them (the data here is illustrative and not based on test results). A first trend line 602 is the trend for a tire on a first wheel and a second trend line 604 is the trend for a tire on a second wheel. It can be seen clearly that the deflation rate for the second wheel is faster than that of the first wheel.

Returning to FIG. 5, at block 510, any tire maintenance requirements are determined. This determination may use the stable data itself, for example making a tire maintenance determination based on the absolute or normalized values. The determination may also use the trend line, which can be indicative of tire health and whether maintenance is required In one example, if the deflation rate indicated by the trend line is greater than a predetermined threshold, such as 5% a day, a maintenance action can be indicated. A deflation rate exceeding a threshold is indicative of a tire fault, but might not be identified from the existing single measurements—the pressure itself may be acceptable but the historical trend shows that deflation is high and the tire and/or wheel should be replaced.

In another example, if the trend line indicates inflation over time, without a corresponding inflation event, a maintenance action can be indicated. Inflation over time cannot occur without an inflation event so this indicates a fault in the tire monitoring device, which should be replaced.

In other examples, the trend line can be used to predict a pressure of the tire at a point in the future and potentially indicate a maintenance action. While the current pressure may be within acceptable limits, so that no action is required at the current time, the trend line can be used to predict the pressure at a future time, such as the time of the next tire pressure check. The next tire pressure check can be determined based on the mandated maximum time between tire pressure checks. An example of a mandated maximum time between tire pressure checks is the interval defined in the Maintenance Planning Documents (MPD) for the aircraft, such as 3 days for a single aisle aircraft such as the Airbus A318, A319, A320, A321 and 48 hours for other aircraft, such as the A380 and A350. Some operators may choose to adopt a shorter time between tire pressure checks than that defined in the MPD, so alternative time periods may be used instead in some examples. In other examples a specific time period to look ahead, or a specific date and time in the future may be received as an input to predict the pressure.

If the predicted pressure at the time in the future, for example the time of the next tire pressure check as required in the MPD, is below acceptable limits a maintenance action can be indicated at the current time, rather than waiting for the next measurement. In this way tires can be maintained more proactively and wear due to underinflation minimized, potentially improving safety and/or tire lifetimes.

Regardless of what maintenance action is indicated, the maintenance action can be indicated at block 512 in any suitable way. For example, a user interface may indicate a need to take a maintenance action. The user interface could be provided as part of a cockpit information system or a separate maintenance device. Providing the indication on a separate maintenance device is useful when the maintainer is carrying out a tire pressure check, for example. Providing the indication on a cockpit system is useful as part of pre-flight checks, for example (as the system uses historical data, analyzing the historical data could form part of a pre-flight check to enhance safety, for example).

In some examples, additionally or alternatively to indicating a maintenance action, a maintenance action may be caused based on the trend line. For example, a nitrogen cart may be dispatched to the aircraft to be used for reinflation, or a tire replacement scheduled.

The method of FIG. 5 could be carried out by any suitable processing system, including the tire monitoring devices themselves. In some examples, the method of FIG. 5 is carried out a central maintenance facility, such as one maintained by an aircraft manufacturer or airline operator or a specialist service contractor. The central system may be sent the data via a computer network responsive to a tire pressure measurement check taking place. This may be beneficial to allow a wider view of tire performance across a fleet to be analyzed. Scheduling maintenance in response to the historical data is also improved when carried out by a central maintenance system because it can take expected destinations into account. If reinflation in the future is predicted, a central maintenance facility could schedule the reinflation for when the aircraft is next at a destination with suitable facilities but still before the pressure is predicted to fall too low, improving maintenance.

Historical data can provide insight into the operation and maintenance of a particular tire or aircraft. Historical tire gas pressure and temperature data can be analyzed for maintenance information, such as identifying a tire with poor inflation performance or shorter life compared to other tires; identifying when a tire is inflated over its lifetime and so on. The data can be used a check, to confirm that tires are being maintained according to the required standards, and may also function as an indicator of another maintenance issue, such as a poorly set up wheel assembly resulting in faster tire wear than normal. By automating the collection of data, a large set of reliable data can be gathered with a much higher measurement frequency than existing checks, which may only occur once every 3 days.

Figure 7:
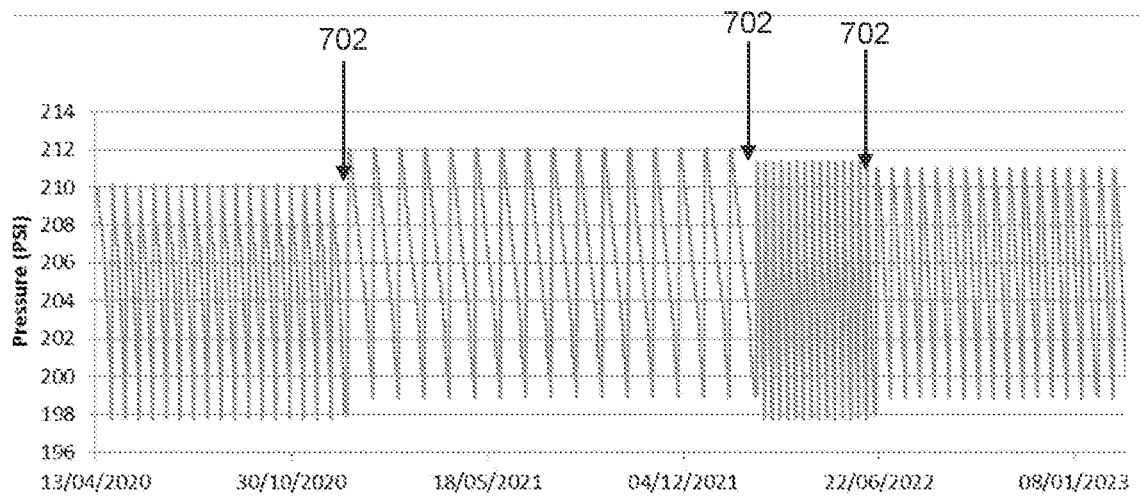
FIG. 7 depicts example normalized pressure data from a first tire monitoring device over a period of three years.
Figure 8:
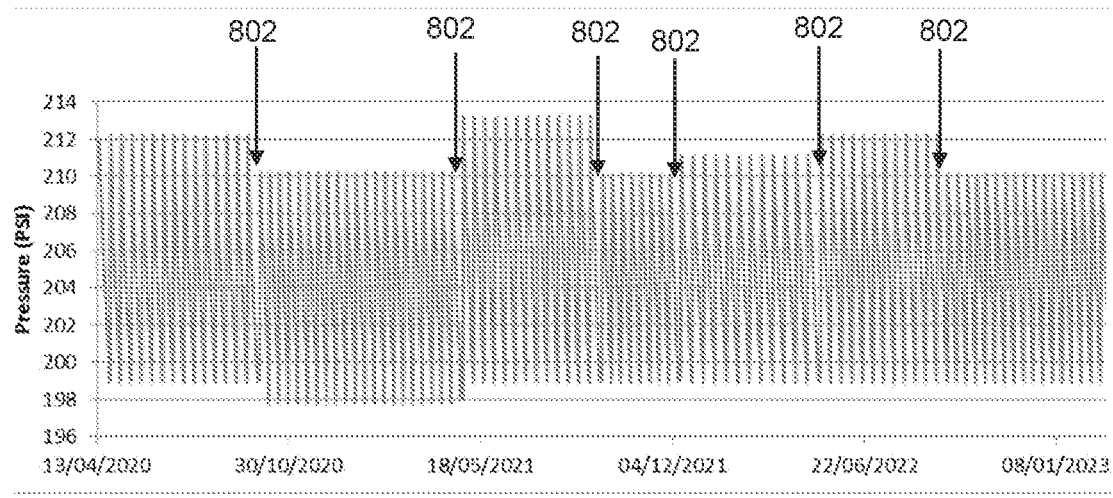
FIG. 8 depicts example normalized pressure data from a second tire monitoring device over the same period of three years.

FIG. 7 depicts example normalized pressure data from a first tire monitoring device over a period of three years. FIG. 8 depicts example normalized pressure data from a second tire monitoring device over the same period of three years. The data depicted in FIGS. 7 and 8 is representative and is not real data, but has been prepared to demonstrate the trends and features that can be identified from real data. Normalized data, such as depicted in FIGS. 7 and 8 can be determined from stable points identified in the historical data which are then converted to be expressed at a common temperature as discussed above. The normalized data then reveals the underlying inflation and deflation trends when viewed over periods of months or years, such as at least three months, at least six months, at least one year or at least two years. Once the data is normalized, an increase in pressure is due to inflation of the tire because, with assumption of an ideal gas and constant volume, the normalizing means that the pressure increase cannot be down to temperature—the only remaining variable that could result in a pressure change. After an inflation event, the pressure then gradually decreases over time due to leakage until the next inflation event. Although normalized data is depicted in FIGS. 7 and 8 and referred to below, directly measured data (not adjusted or normalized) is also useful alternatively or in addition to the normalized data. For example, directly measured data can give useful information on the absolute effects of temperature and the operating environment, which can be useful to determine impact on inflation and deflation trends.

The depiction of the normalized data allows the inflation-deflation cycles in FIGS. 7 and 8 to be easily seem from the visible pattern. Inflation may also be determined by analyzing the data numerically, for example an inflation event may be determined by determining a time where pressure increased with a gradient of greater than 0.25 psi (1.7 kPa/0.017 Bar), 0.5 psi (3.4 kPa/0.034 Bar) or 1 psi (6.9 kPa/0.069 Bar) per minute. This can filter any effects due to imperfect normalization rather than simply looking for any increase in pressure. (The stable points are a good indicator of gas temperature, but the temperature sensor is still indirectly coupled which can introduce a small error.)

A similar gradient analysis can also be used to identify inflation events when the pressure is not normalized, with a suitable threshold. Although temperature also causes changes in pressure, heating of the gas in service does not increase the pressure as quickly as this, so gradient analysis of pressure data can be a reliable way to determine an inflation event.

An inflation event can also be identified by looking for a step change in the normalized pressure, from less than 100% to greater 105% the reference pressure for the tire without a corresponding change in temperature.

Another way that an inflation event could be recognized is to compare the pressure and temperature gradients, if the temperature gradient indicates that temperature is substantially constant but pressure is increasing then this is also indicative of an inflation event; without a temperature rise or volume change the only way pressure can increase is by inflation.

In addition to this cycle of inflation and deflation, the timescale of the graphs in FIGS. 7 and 8 also allows tire changes to be determined. On FIG. 7, a tire change is indicated by arrow 702, on FIG. 8 a tire change is indicated by arrow 802. A tire change can be determined from the data by a change in deflation rate between inflation events and/or a change in maximum or minimum pressure. A change in the deflation rate can be due to changes in the interface between the wheel and the tire when the tire is replaced, or down to changes in the construction of the tire. A change in pressure can be because the entire wheel is usually changed when a tire replacement is required. As well as determining a tire change from the historical data itself, data of a tire change can be provided separately, for example by consulting maintenance records stored in a database recording that a tire change has taken place. Tire changes may also be recorded by the tire monitoring device, which may sense the drop in pressure during the tire change process and record a tire change event at that time.

FIGS. 7 and 8 show how historical data can be useful to determine maintenance information both in isolation (i.e. considering a single wheel) and in combination (i.e. comparing data of at least two different wheels). Each of FIGS. 7 and 8 enables individual tire service life to be determined, and perhaps the performance of different models or brands of tires to be compared. When the tire lifetimes in FIG. 7 are compared to FIG. 8, further maintenance information and trends can be determined. The data shows that the wheel of FIG. 7 required only three tire changes compared to six for the wheel of FIG. 8 over the same time period. By analyzing the data and determining a tire replacement frequency, or a time interval between tire replacements, discrepancies for a particular wheel may be identified. For example, the wheel of FIG. 8 may be identified for maintenance because the increased replacement frequency suggests that the wheel is set up in way that increases tire wear. Such wheel maintenance may be indicated or scheduled when the tire replacement frequency exceeds a predetermined threshold, when the tire replacement interval is shorter than a predetermined threshold, or when either or both of these characteristics differs by at least 20%, 30%, 40% or 50% from another wheel on the same aircraft.

The historical data can also be used to identify poor maintenance practices or to confirm that adequate maintenance has taken place. For example, the data can reveal the minimum pressure of a tire in service between two consecutive inflations of the tire. If the minimum pressure is below a predetermined threshold it can indicate poor maintenance: a tire is not being inflated when it should be. Furthermore, by determining a time for which pressure remains below the threshold, the severity of the under-inflation can be determined. If the under threshold pressure condition lasts less than the time mandated between pressure checks, such as 3 days, then it may be less serious because it can be assumed that inflation was carried out as soon as the under threshold pressure condition was noticed. However, an under threshold pressure condition lasting more than the mandated time between pressure checks is more serious, because the longer interval suggests that either inflation checks are not being carried out as required or that an inflation check has been carried out but some reason the under-inflation condition was not identified. In other examples, timings other than the mandated time between pressure checks may be used, such as the interval specified by a particular operator. This can be useful for ensuring the maintenance is carried to the required standards, such as when an aircraft is operating away from its home maintenance base or when maintenance has been subcontracted to a third party Similarly, the historical data can be used to identify the maximum pressure of a tire in service, for example between two consecutive inflations of the tire. This can also indicate poor maintenance; tires may be over-inflated to allow longer between inflation events, but an over inflated tire may wear more quickly. Over-inflation may be identified by comparing the maximum pressure to a threshold and providing a maintenance indication to take action if the pressure is exceeded, such as to reduce the tire pressure.

If additional data is available about the tires fitted to the wheel, for example recorded in a maintenance database, then further insight can be gained from the historical data. Tire brands and/or models can be compared to identify those which perform the best using in-service data, without requiring expensive laboratory testing. Retreading or remolding an aircraft tire is also common. The additional data relating to the tire may comprise a retread count, indicating how many times it has been retreaded. In-service performance, such as deflation rate and time before replacement, can then be compared to determine whether there is a correlation with retreading and the number of times a tire has been retreaded.

If the tire monitoring device has access to GPS data, a GPS location may be associated with the historical tire gas pressure and temperature, indicating location at the time of the measurement. When location data is available it can be combined with other maintenance data to identify any maintenance locations that are underperforming, such as consistently over-inflating tires. The GPS data may come from a GPS unit which is built into the tire monitoring device or from an external source, such from another system on the aircraft which is queried by the tire monitoring device.

While using normalized data for this historical trend analysis has been assumed above, absolute measured values can also be used. This can be most beneficial for determining times when the pressure exceeded a predetermined maximum measured pressure threshold, or was under a predetermined minimum pressure threshold as the actual pressure may vary significantly from the normalized pressure (compare the variation in FIG. 4, where the data is not normalized, with FIG. 7, for example).

Figure 9:
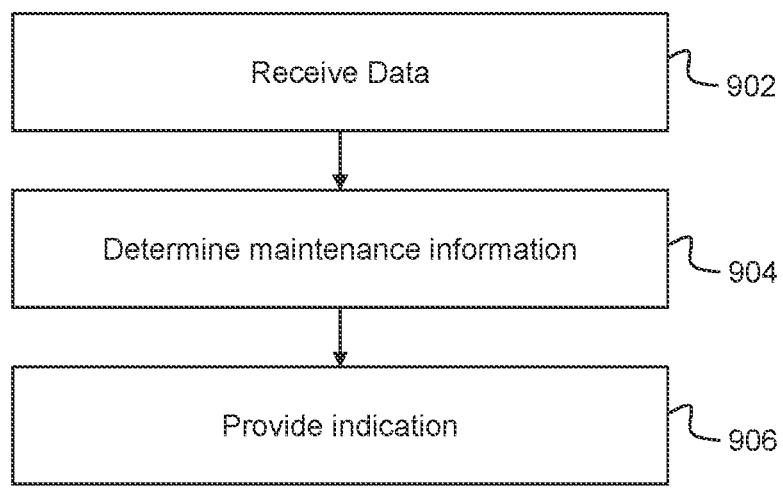
FIG. 9 is a flow chart of historical data to identify maintenance information or maintenance trends.

FIG. 9 depicts a method by which analysis of historical data to identify maintenance information or maintenance trends can be carried out. The method is implemented by a processing system, for example a processing system forming part of a central maintenance system or a standalone maintenance device.

At block 902, data is received of a plurality of tire gas pressure measurements each measurement having an associated time. This data may span a predetermined period, such as the past six months, past year, past 2 years, past 3 years or longer. Alternatively, all the data available for a tire may be received. The data may be received over a communication interface or received from storage of the device carrying out the method. The pressure data can have been normalized to a reference temperature, for example by determining stable points as discussed above, or can be the actual measured pressure. Temperature data can also be included, which is particularly useful when the data is actual measured pressure rather than normalized pressure.

Next, at block 904, the received data is analyzed to determine maintenance information, wherein the maintenance information comprises at least one of: an inflation event, a maximum pressure, a minimum pressure and a tire replacement event. Any of the examples discussed above can be used to determine these events.

At block 906, an indication based the determined maintenance information is provided. The indication may be visual or audible. For example, if the historical data suggests no problems, the indication may simply be a "OK" or a green light. If there are points to address, such as high replacement frequency on a particular wheel, then an appropriate indication can be provided such as "service wheel 4".

Where the method runs on a central maintenance system, the indication can relate to performance of particular service locations or service facilities, such as "service location 1 is consistently over inflating tires".

In some examples, the method may further include scheduling maintenance in addition to providing the notification, for example scheduling a wheel check next time the aircraft is in a maintenance location when the tire replacement frequency is too high.

In the method of FIG. 9, the historical data could be stored locally or at a remote location. Remote storage can allow a standalone maintenance device to access the historical data when needed without requiring a large storage capacity in the device itself. Remote storage can also allow aggregation of historical data across a plurality of maintenance locations.

In some examples, the method of FIG. 9 may include associating a unique tire identifier with the maintenance information in a database. The unique tire identifier can identify a tire independent of its installation on a particular aircraft. While a tire in service can be identified by a combination of aircraft tail ID and wheel position, this is not suitable for identifying tires independently of the aircraft, for example a same tire may change position and/or aircraft during its lifetime. Similarly, a same aircraft will have many different tires fitted to it over its lifetime.

The unique tire identifier may be a number or alphanumeric identifier. The unique tire identifier may be indicated on the tire in any suitable way, these include a barcode (one- or -two dimensional) other visible markings printed on the tire, embossed on the tire, or debossed on the tire. The unique tire identifier may also be incorporated in a way which is not visible, such as using a Near Field Communication (NFC) or Radio Frequency ID (RFID) tag embedded in or affixed to the tire.

As mentioned above, aircraft tires can be retreaded multiple times during their operational life. It is unlikely that a tire will be reinstalled back to the same aircraft and wheel position following a retread, indeed, it may not even be reinstalled to another aircraft belonging to a same operator. The unique tire identifier enables the historical data to be associated with a particular tire. While retread events can be tracked with a paper-based system, this prone to human error. Associating the unique tire identifier with the historical information in a database can reduce human error and enable new safety features.

The database associated the unique tire identifier with the historical information is preferably remotely stored in a location accessible wherever tire maintenance takes place, or stored in multiple locations with data synchronized between the multiple locations. The maintenance information may be associated with the tire in various ways, for example by recording every piece of determined maintenance information against the tire, so that the tire's service history is stored. Alternatively, the maintenance information may simply be a flag which indicates whether or not a tire is safe to use, so that a tire can easily be marked as unsafe and prevented from returning to service.

In one example, data in the database is accessed to determine whether a tire is safe to use, by querying the database with the unique tire identifier. The database may have an Application Program Interface (API) that receives such queries and returns a "safe" or "unsafe" indication in response to the query. The response can be based on an indication in the database of at least one of: the tire marked as safe, that no dangerous maintenance information is recorded against the tire in the database, and the absence of data that the tire should not be used. Alternatively, the database may return the maintenance information stored in database for the tire in response to the query, which is then interpreted by the device that sent the query.

In another example, the data in the database is updated with determined maintenance information, for example by adding any specific determined maintenance information to the record along with a time stamp indicating the current date and/or time. In some examples, historical measurement data, such as tire gas pressure and tire gas temperature, is also stored. This gives a record not just of maintenance but also operation of the tire.

A database which associates the tire maintenance data with a unique tire identifier may improve safety. In one example, human error when checking that a tire is safe to use is reduced. In another example, human error when recording maintenance information against the tire, such as that the tire is unsafe and should no longer be used, can be reduced by automating the database update so as not to require specific user input.

While retreading is a safe procedure and has environmental benefits to prolong tire life, it has a limit. For example, wear to other elements of the tire than the tread, such as a side wall, is not necessarily addressed during a retread. For this reason, a limit is set for the number of retreads a tire can have before it must be removed from service, such as a maximum of 7 retreads. One example may associate a retread count with the tire unique identifier so that the retread count can be determined by querying the database. For example, a maintenance facility or factory processing the retread of the tire may access the database and recycle the tire if the retread count is at the maximum number. Following the retread operation, the maintenance facility may update the retread count in the database for the tire.

Storing the maintenance information in a database may also enable improved reporting and checking of dangerous tire operation. There are some operational conditions after which a tire is recommended to be removed from service and not subject to any further retreads, regardless of whether it has reached the retread maximum.

Examples of determining that a tire is unsafe and should no longer be used, even after a retread, will now be described with reference to FIGS. 11 to 14.

Figure 11:
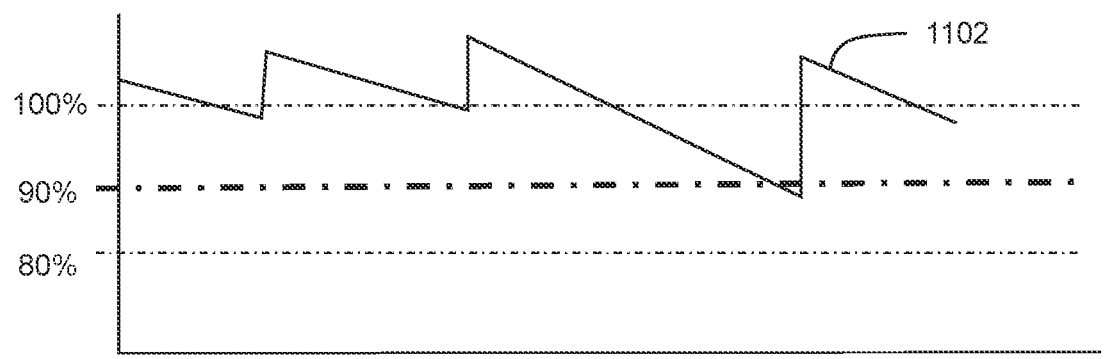
FIGS. 11 to 14 depict examples of historical tire pressure data against time, indicating that a tire is unsafe and should no longer be used.

FIG. 11 depicts representative historical pressure measurements 1102 against time for an example tire, the measurements are absolute measurements or Gauge Pressure, not corrected for temperature. The vertical axis is expressed as a percentage of reference pressure, so a value of 100% means that the tire gas is at the reference pressure. As can be seen, the historical pressure measurements show a trend of inflation events followed by gradual deflation. However, the pressure trend indicates that at one point, a longer time passed between reinflation and the gas pressure in the tire dropped more than in other inflation cycles. A low inflation pressure may cause a tire to flex more than expected, reducing tire life. In the example of FIG. 11 if it is determined that tire pressure is less than a predetermined out of service threshold of 90%, at any point in the historical data, then the maintenance information indicates that the tire should be taken out of service and not reused. The database may be automatically updated with this information to prevent the tire from being inadvertently reused.

The pressure data in FIG. 11 shows that a reinflation event took place after the pressure in the tire fell below 90%. However, by analyzing the historical data the potentially dangerous low pressure can still be identified. This may be used to identify any poor maintenance practices and perhaps provide retraining as needed. Alternatively, or additionally, if additional operational conditions after which a tire should be taken out of service are determined while tires are in use, they can be applied to installed tires using the historical information to enable any which require removal from service. For example, additional failure modes and their cause may be identified.

Figure 12:
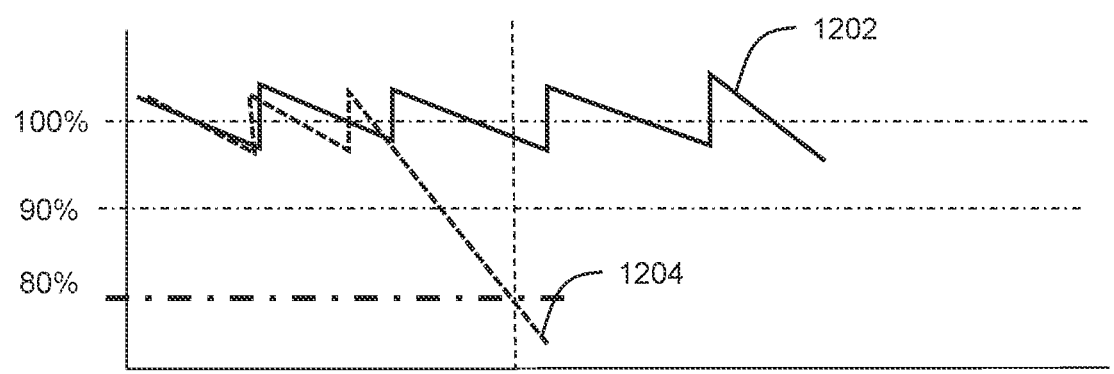

Moving on to FIG. 12, historical pressure data 1202, 1204 of two tires which are installed on same axle are depicted. The database may allow tires to be associated with related tires, such as tires installed on a same axle. Over the life a tire it may have several other tires installed alongside it on an axle, so the data of related tires can also indicate a time period for which the tire was installed on a same axle, alternatively only a current tire installed on a same axle as the tire can be stored.

FIG. 12 shows that a first tire having historical pressure data 1202 has operated normally, but a second tire having historical pressure data 1204 has suffered a significant loss of pressure to below 80% of the reference pressure. Such a loss of pressure can cause damage not only to the tire through increased flexure, but also to a tire on the same axle because that tire carries a greater loading than if the tires were inflated more evenly. In that case, when a tire gas pressure is less than a predetermined associated tire removal threshold of 80%, then both the deflated tire and the associated tire mounted on the same axle are updated with maintenance information to indicate that they are taken out of service and not reused.

Figure 13:
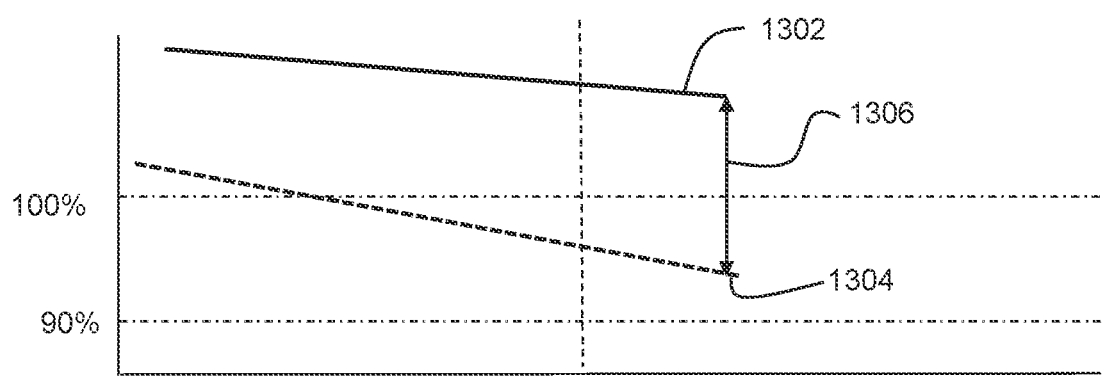

FIG. 13 shows historical pressure data 1302, 1304 over time for another pair of tires mounted on a same axle. In this case both tires operate individually within acceptable parameters. While pressure data 1304 indicates a faster deflation rate than pressure data 1302, it remains above 90%. However, in this case the varying deflation rates mean that a differential pressure 1306 between the tires is greater than a predetermined differential threshold of 20%. Again, this can lead to uneven loading and increased wear so both tires should be taken out of service and not reused. The database is updated with maintenance information accordingly.

Figure 14:
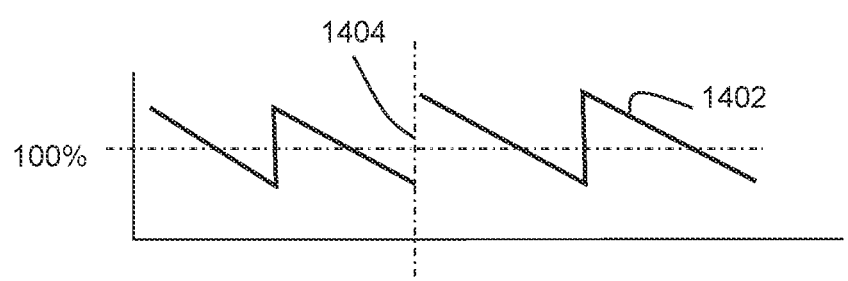

FIG. 14 depicts example pressure data for a tire which should have been removed from service but is inadvertently returned to service. Tire damage and wear is difficult to spot unless it is very significant. A visual inspection may suggest that the tire is undamaged, especially in a case where a tire is removed from service because of the low pressure of another tire on the same axle (such as in the cases described above for FIGS. 12 and 13 above). FIG. 14 shows a discontinuity 1404 in the pressure data 1402 where the tire was removed from service. It was then inadvertently returned to service. By checking the database to determine that the tire is safe to use, it can be identified that the tire should not be in use and requires removal and disposal, even though the historical pressure data shows operation within acceptable limits.

Figure 10:
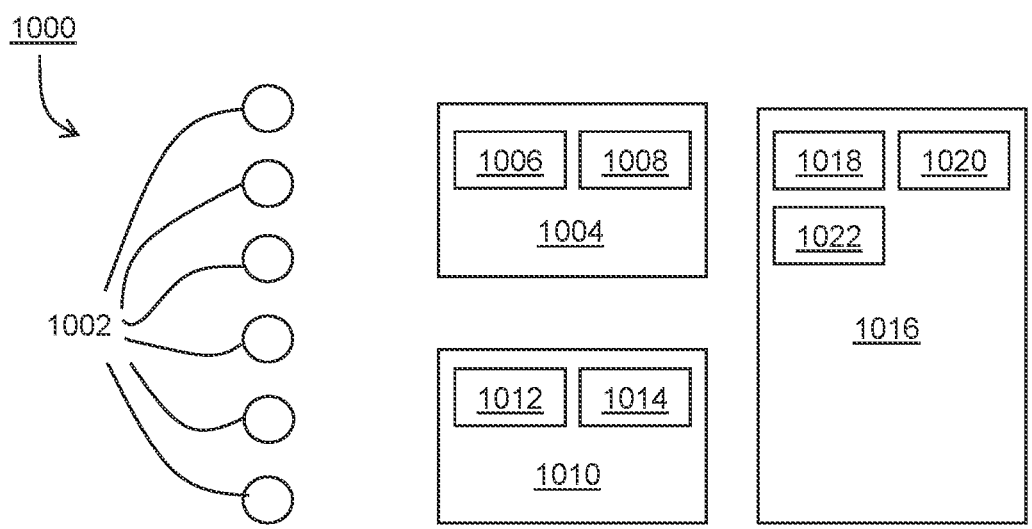
FIG. 10 shows a schematic representation of a system in which the methods may be implemented.

FIG. 10 is a schematic diagram of a system 1000 in which the methods of the present invention can be carried out. A plurality of tire monitoring devices 1002 as discussed above with reference to FIG. 1 are provided on a same aircraft. In this case there are six tire monitoring devices 1002 for a six-wheeled aircraft, such as an Airbus A320 discussed above with reference to FIG. 2. The tire monitoring devices 1002 are in communication with a cockpit information system 1004, which includes a processing system 1006 and a communication interface 1008. The tire monitoring devices are also in communication with a separate maintenance device 1010, such as a smart phone running a suitable app or another portable or hand-held device that can be used to interrogate the sensors and receive historical measurement data from the tire monitoring devices. Similar to the cockpit information system 1004, the maintenance device 1010 includes a processing system 1012 and a communication interface 1014.

One or both of the cockpit information system 1004 and the maintenance device 1010 is also in communication with a central maintenance system 1016. The central maintenance system 716 comprises a processing system 1018, a communication interface 1020 and a database 1020. At predefined times, or in response to predetermined events, such as taking a tire pressure measurement, the cockpit information system and/or the maintenance device 1010 transmit historical data of tire pressure and temperature measurements to the central maintenance system using the communication interfaces. This can include tire unique identifiers and determined maintenance information, such as an indication that the tire should be removed from service. The communication interface 1008, 1014 of the cockpit information system and the maintenance device may comprise a separate interface for communicating with the central maintenance system or the same interface can be used as for communicating with the tire monitoring devices 1002. For example, the maintenance device communicates with the tire monitoring devices over a first wireless communication interface, such as according to an IEEE 802.11 standard or Bluetooth, and communicates with the central maintenance system 1016 over a second wireless communication interface, such as one according to a cellular standard, such as those defined by 3GPP or ETSI.

Reference to a "processing system" includes system with one or more processors (which may have one or more cores) as well as distributed processing systems which may be distributed over a plurality of physical devices and/or locations.

Where methods have been described above, they can be implemented wholly in software, wholly in hardware (such as by an application specific integrated circuit) or any combination of software and hardware. A software implementation may comprise computer-readable medium comprising instructions that instruct a processor to carry out the method. The computer-readable medium may be a non-transitory computer readable medium.

It is to be noted that the term "or" as used herein is to be interpreted to mean "and/or", unless expressly stated otherwise.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments.

Furthermore, equivalents and modifications not described above may also be employed without departing from the scope of the invention, which is defined in the accompanying claims.

The invention is:

1. A method of tire maintenance comprising:
actuating pressure sensors mounted to at least two tires on an aircraft;
measuring tire gas pressure in the at least two tires using the pressure sensors in response to the actuation of the pressure sensors;
receiving data regarding the measured tire gas pressures in the at least two tires, wherein the data comprises the plurality of tire gas pressure measurements each measurement having an associated time;
  analyzing the received data to determine maintenance information, wherein the maintenance information comprises at least one of: an inflation event, a maximum pressure, a minimum pressure or a tire replacement event;
  wherein the analyzing the received data further includes determining deflation rates for the at least two tires and comparing the deflation rates to identify the deflation rate that is greater than at least one other of the deflation rates,
  wherein the maintenance information further includes information regarding the identified deflation rate, and
  providing aircraft tire maintenance based the determined maintenance information, wherein the aircraft tire maintenance is at least one of adding a gas to at least one of the two tires on the aircraft to reinflate the tire or removal from the aircraft of the at least one of the two tires.

2. The method according to claim 1, wherein the maintenance information comprises a minimum pressure and the analyzing comprises: determining a minimum pressure between two consecutive inflation events; and determining that the minimum pressure is lower than a predetermined threshold.

3. The method according to claim 2, further comprising determining a period of time for which the pressure was lower than the predetermined threshold.

4. The method according to claim 1, wherein the maintenance information comprises a maximum pressure and the analyzing comprises:
  determining a maximum pressure between two consecutive inflation events; and
  determining that the maximum pressure is greater than a predetermined threshold.

5. The method according to claim 1, wherein the maintenance information comprises an inflation event and the analyzing comprises:
  determining an inflation event by identifying a positive pressure gradient which is greater than 1 psi per minute.

6. The method according to claim 5, wherein the analyzing comprises determining an inflation frequency or an interval between consecutive inflation events.

7. The method according to claim 6, wherein the analyzing comprises determining a tire replacement frequency or an interval between consecutive tire replacements.

8. The method according to claim 1, further comprising normalizing the pressure data to express pressure at a predetermined reference temperature.

9. The method according to claim 1, further comprising scheduling a maintenance action based on the determined maintenance information.

10. The method according to claim 1, wherein the receiving data comprises receiving data comprising a tire unique identifier associated with the plurality of tire gas pressure measurements; the method further comprising:
  determining, using a database, that the tire unique identifier corresponds to a tire which is safe to use.

11. The method according to claim 1, wherein the receiving data comprises receiving data of a tire unique identifier associated with the plurality of tire gas pressure measurements; the method further comprising:
  updating a database based on the maintenance information and the tire unique identifier.

12. A processing system configured to implement the method of claim 1.

13. A non-transitory computer readable medium comprising computer executable instructions that, when executed by a processing system, instruct the processing system to perform the method of claim 1.

14. The method of claim 1, wherein the providing the indication includes providing or adjusting a tire replacement schedule for each of the at least two tires.

15. A method of tire maintenance comprising:
  actuating pressure sensor mounted to a tire mounted to an aircraft;
  in response to the actuation of the pressure sensor, measuring tire gas pressure in the tire using the pressure sensor to generate a plurality of tire gas pressure measurements each having an associated time of measurement;
  receiving data representative of the plurality of tire gas pressure measurements and the associated time of measurement;
  analyzing the received data to determine an inflation event by determining an inflation frequency or an interval between consecutive inflation events;
receiving data comprising a retread count of the tire,
  determining whether there is a correlation between the retread count and the inflation frequency, the interval between consecutive inflation events, tire replacement frequency, or an interval between consecutive tire replacements, and
  providing aircraft tire maintenance based the determined maintenance information and the determined correlation, wherein the aircraft tire maintenance is at least one of adding a gas to at least one of the two tires on the aircraft to reinflate the tire or removal from the aircraft of the at least one of the two tires.

16. A method of tire maintenance comprising:
  actuating pressure sensors mounted to at least two tires on an aircraft;
  measuring tire gas pressure in the at least two tires the using pressure sensors in response to the actuation of the pressure sensors;
  receiving data representative of the measured tire gas pressures from the at least two tires, wherein the data comprises a plurality of the tire gas pressure measurements and an associated time of each of the tire gas pressure measurements;
  analyzing the received data to determine a plurality of inflation events, to determine deflation rates for each of the at least two tires, and to compare the deflation rates to identify a first deflation rate of the deflation rates that that is greater than the deflation rate of at least one other of the at least two tires;
  determining a minimum pressure between two consecutive inflation events;
  determining tire maintenance information for each of the at least two tires based on comparing the minimum pressure to a predetermined threshold and the first deflation rate; and
  providing aircraft tire maintenance based on the tire maintenance information, wherein the aircraft tire maintenance is at least one of adding a gas to at least one of the two tires on the aircraft to reinflate the tire or removal from the aircraft of the at least one of the two tires.

17. The computer-implemented method of claim 16, wherein the providing the indication includes providing or adjusting a tire replacement schedule for each of the at least two tires.

* * * * *